United States Patent
Noguchi et al.

(10) Patent No.: US 8,409,492 B2
(45) Date of Patent: Apr. 2, 2013

(54) METHOD FOR PRODUCING ALUMINUM TITANATE CERAMIC

(75) Inventors: Yasushi Noguchi, Nagoya (JP); Atsushi Kaneda, Ichinomiya (JP); Takayuki Inoue, Nagoya (JP); Mariko Kusabe, Nagoya (JP)

(73) Assignee: NGK Insulators, Ltd., Nagoya (JP)

( * ) Notice: Subject to any disclaimer, the term of this patent is extended or adjusted under 35 U.S.C. 154(b) by 344 days.

(21) Appl. No.: 12/707,726

(22) Filed: Feb. 18, 2010

(65) Prior Publication Data

US 2010/0230870 A1    Sep. 16, 2010

(30) Foreign Application Priority Data

Mar. 16, 2009  (JP) .................. 2009-062949

(51) Int. Cl.
*B28B 3/20* (2006.01)
(52) U.S. Cl. ..................................... 264/630
(58) Field of Classification Search ............ 264/630
See application file for complete search history.

(56) References Cited

U.S. PATENT DOCUMENTS

| | | | | |
|---|---|---|---|---|
| 5,422,324 A * | 6/1995 | Noguchi et al. | ........ | 501/128 |
| 6,165,936 A * | 12/2000 | Yamada et al. | ........ | 502/439 |
| 7,473,392 B2 * | 1/2009 | Wusirika | ........ | 264/631 |
| 7,481,962 B2 * | 1/2009 | Kotani et al. | ........ | 264/631 |
| 7,704,442 B2 * | 4/2010 | Noguchi et al. | ........ | 264/630 |
| 8,037,674 B2 * | 10/2011 | Kupe et al. | ........ | 60/286 |
| 2002/0130447 A1 * | 9/2002 | Beall et al. | ........ | 264/630 |
| 2006/0215814 A1 * | 9/2006 | Kotani et al. | ........ | 378/75 |
| 2006/0281626 A1 | 12/2006 | Makino | | |
| 2007/0063397 A1 * | 3/2007 | Inoue | ........ | 264/628 |
| 2007/0063398 A1 * | 3/2007 | Takahashi | ........ | 264/630 |
| 2008/0124516 A1 * | 5/2008 | Noguchi et al. | ........ | 428/117 |
| 2010/0086731 A1 * | 4/2010 | Noguchi et al. | ........ | 428/116 |
| 2010/0203284 A1 * | 8/2010 | Kanai | ........ | 428/116 |
| 2010/0257829 A1 * | 10/2010 | Yamaguchi | ........ | 55/495 |
| 2011/0152075 A1 * | 6/2011 | Raffy et al. | ........ | 502/439 |

FOREIGN PATENT DOCUMENTS

| | | |
|---|---|---|
| JP | 2006/028506 A2 | 3/2006 |
| JP | 2006-347793 A1 | 12/2006 |
| JP | 2007-533591 A1 | 11/2007 |

* cited by examiner

*Primary Examiner* — Matthew Daniels
*Assistant Examiner* — Russell Kemmerle, III
(74) *Attorney, Agent, or Firm* — Burr & Brown

(57) ABSTRACT

A method for producing an aluminum titanate ceramic, which comprises subjecting, to forming, a raw material for aluminum titanate formation, containing $Na_2O$-containing α-alumina particles, to obtain a formed body and then firing the body, wherein the α-alumina particles has such a crystal structure that the ratio of the average value of the average length in axis a direction and the average length in axis b direction, to the average length H in axis c direction is 3 or more.

20 Claims, 1 Drawing Sheet

METHOD FOR PRODUCING ALUMINUM TITANATE CERAMIC

FIELD OF THE INVENTION

The present invention relates to a method for producing an aluminum titanate ceramic. More particularly, the present invention relates to a method for producing an aluminum titanate ceramic superior in dimensional accuracy.

DETAILED DESCRIPTION OF THE INVENTION

Diesel particulate filter (hereinafter referred to as "DPF") is in use in order to capture and remove the particulate matter (hereinafter referred to as "PM") contained in the exhaust gas emitted from automobile. Since DPF is ordinarily used at high temperatures, there is used, in production of the DPF, a material small in thermal expansion coefficient and superior in thermal shock resistance, such as cordierite or silicon carbide (SiC).

As the material used for such a DPF, aluminum titanate has drawn attention in recent years. For example, there is a disclosure on a method for producing a ceramic structure using a mixed composition powder comprising at least 45 mass % of an aluminum source (containing at least 5 mass % of boehmite) and at least 30 mass % of titanium oxide (see, for example, Patent Document 1). According to this production method, a ceramic structure small in thermal expansion coefficient and superior in thermal shock resistance as well as dimensional accuracy can be produced at relatively low temperature.

Also, there is a disclosure on an aluminum titanate ceramic article characterized by comprising a main crystalline phase composed of aluminum titanate and material components including aluminum, titanium, silicon, alkaline-earth metals and rare-earth metals (see, for example, Patent Document 2). This aluminum titanate ceramic article has a low thermal expansion coefficient, a high porosity and a high strength.

Patent Document 1: JP-A-2006-347793
Patent Document 2: JP-A-2007-533591

However, as the raw material for aluminum titanate, there are ordinarily used artificial raw materials such as alumina and titania and there is used no clay type raw material of good formability. Therefore, when aluminum titanate is used as a material for DPF and extrusion into honeycomb shape is conducted, the formability into formed body is not always good and the dimensional accuracy of the DPF obtained is low in some cases.

Also, it is known that aluminum titanate is decomposed into alumina and titania at 800 to 1,100° C. The decomposition is accelerated particularly under a reducing atmosphere. When the formed body is used as a DPF, the DPF is exposed in a reducing atmosphere when the carbon captured by the DPF is burnt and removed; hence, the DPF is required to have decomposition resistance at high temperature.

SUMMARY OF THE INVENTION

The present invention has been made in view of the above-mentioned problems of the prior art. The present invention has a task of providing a method for producing an aluminum titanate ceramic superior in dimensional accuracy.

The present inventors made a study in order to achieve the above task. As a result, it was found that the task could be achieved by using particular α-alumina particles. The finding has led to the completion of the present invention.

According to the present invention, there is provided a method for producing an aluminum titanate ceramic, which is described below.

According to a first aspect of the present invention, a method for producing an aluminum titanate ceramic is provided, which comprises forming a raw material for aluminum titanate formation, containing $Na_2O$-containing α-alumina particles, to obtain a formed body, and then firing the body, wherein the α-alumina particles has such a crystal structure that the ratio of the average value of the average length in axis a direction and the average length in axis b direction, to the average length in axis c direction is 3 or more.

According to a second aspect of the present invention, the method for producing an aluminum titanate ceramic, according to the first aspect is provided, wherein the average particle diameter of the α-alumina particles is 6 to 15 μm.

According to a third aspect of the present invention, the method for producing an aluminum titanate ceramic, according to the first or second aspects is provided, wherein the proportion of the α-alumina particles contained in the raw material for aluminum titanate formation is 10 to 60 mass %.

According to a fourth aspect of the present invention, the method for producing an aluminum titanate ceramic, according to any of first to third aspects is provided, wherein the proportion of the $Na_2O$ contained in the α-alumina particles is 0.01 to 0.1 mass %.

According to a fifth aspect of the present invention, the method for producing an aluminum titanate ceramic, according to any of first to third aspects is provided, wherein the proportion of the $Na_2O$ contained in the α-alumina particles is 0.01 to 0.03 mass %.

According to a sixth aspect of the present invention. the method for producing an aluminum titanate ceramic, according to any of first to fifth aspects is provided, wherein the formed body has a honeycomb structure.

According to the method for producing an aluminum titanate ceramic of the present invention, an aluminum titanate ceramic superior in dimensional accuracy can be produced.

DESCRIPTION OF REFERENCE NUMERALS

Figure 1:
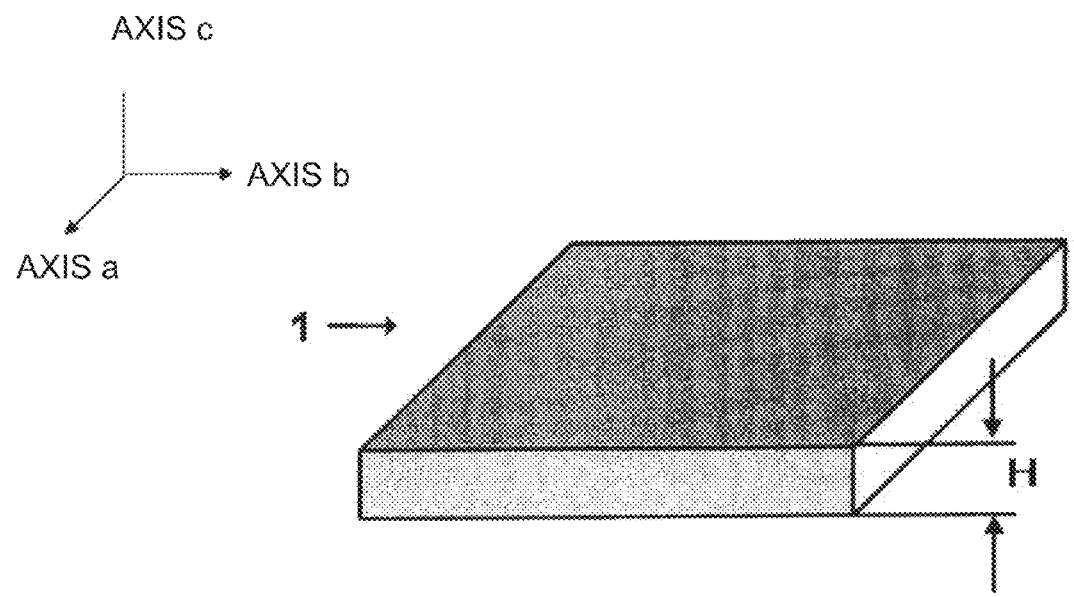
FIG. 1 is a schematic view showing an example of the crystal structure of α-alumina particle.

1: α-alumina particle, 2: aluminate titanate ceramic, 3: partition wall, 4: cell, and H: average length in axis c direction.

DETAILED DESCRIPTION OF THE INVENTION

The mode for carrying out the present invention is described below. However, the present invention is not restricted to the following embodiment, and it should be construed that appropriate changes, improvements, etc. can be added to the following embodiment based on the ordinary knowledge possessed by those skilled in the art as long as there is no deviation from the gist of the present invention and that the resulting embodiments as well fall in the scope of the present invention.

The method for producing an aluminum titanate ceramic of the present invention is a method which comprises subjecting, to forming a raw material for aluminum titanate formation, containing α-alumina particles (the raw material for aluminum titanate formation is hereinafter referred to as "raw material for AT formation"), to obtain a formed body and then firing the formed body. More specifically, it is a method which comprises preparing a kneaded clay from a raw material for AT formation, subjecting the a kneaded clay to forming, to obtain a formed body, drying the formed body, and firing the dried formed body at 1,350 to 1,500° C.

The raw material for AT formation contains α-alumina particles. The components contained in the raw material for AT formation, other than the α-alumina particles include a titania source raw material, a silica source raw material, a magnesia source raw material, etc.

The α-alumina particles have such a crystal structure that the ratio (D/H) of the average value (D) of the average length in axis a direction and the average length in axis b direction, to the average length (H) in axis c direction is 3 or more, and contain $Na_2O$.

The average particle diameter of the α-alumina particles is preferably 6 to 15 μm, more preferably 8 to 12 μm. When the average particle diameter of the α-alumina particles is in such a range, the aluminum titanate ceramic obtained can have an appropriate average pore diameter. When the average particle diameter is smaller than 6 μm, the average pore diameter of the aluminum titanate ceramic is small and, when the aluminum titanate ceramic is used as a DPF, the pressure loss thereof is high in some cases. Meanwhile, when the average particle diameter is larger than 15 μm, the average pore diameter of the aluminum titanate ceramic is large and, when the aluminum titanate ceramic is used as a DPF, its efficiency for PM capture is low in some cases. Incidentally, the average particle diameter of the α-alumina particles refers to a value of 50% particle diameter measured by a laser diffraction/scattering type grain size analyzer (for example, "LA-920" (trade name) produced by HORIBA, Ltd.) based on the light scattering method. The measurement is carried out in a state in which α-alumina particles are dispersed completely in water.

The α-alumina particles have such a crystal structure that the ratio (D/H) of the average value (D) of the average length in axis a direction and the average length in axis b direction, to the average length (H) in axis c direction is 3 or more, preferably 5 or more. Ordinarily, α-alumina particles are largely classified into particles having a platy crystal structure and particles having a round, spherical crystal structure. In the present invention, there are used α-alumina particles having a crystal structure of 3 or more D/H; that is, in the present invention, there are used α-alumina particles 1 having a platy crystal structure, shown in FIG. 1. By using α-alumina particles 1 having a crystal structure of 3 or more D/H, platy α-alumina particles 1 are orientated during forming, whereby the shape retainability of the formed body obtained is high and an aluminum titanate ceramic superior in dimensional accuracy can be produced. Incidentally, the axis c direction indicates a direction perpendicular to the face c [(006) face] of α-alumina particle 1, in the α-alumina particles 1 such as shown in FIG. 1; and the axis a direction and the axis b direction indicate directions intersecting at right angles and perpendicular to the axis c direction.

In FIG. 1, the average length (H) in axis c direction, in α-alumina particle 1 is the average thickness of the α-alumina particle 1, and the average value (D) of the average length in axis a direction and the average length in axis b direction is the average value of the average width in axis a direction and the average width in axis b direction, in α-alumina particle 1. Incidentally, such an average thickness and such average widths can be measured by an electron microscope and electron backscatter diffraction (EBSD).

$Na_2O$ is an impurity inevitably present in the α-alumina particles. The proportion of $Na_2O$ contained in the α-alumina particles is preferably 0.01 to 0.1 mass %, more preferably 0.01 to 0.03 mass %. With such a small proportion of $Na_2O$, the decomposition of aluminum titanate ceramic at high temperature and under reducing atmosphere can be suppressed. When the proportion of $Na_2O$ is higher than 0.1 mass %, the decomposition of aluminum titanate ceramic at high temperature and under reducing atmosphere may not be suppressed.

The proportion of the α-alumina particles contained in the raw material for AT formation is preferably 20 to 70 mass %, more preferably 30 to 65 mass %, particularly preferably 40 to 60 mass %. When the proportion of α-alumina particles is not in this range, the proportion of the aluminum titanate contained in the aluminum titanate ceramic after firing is low and the firing product has low heat resistance in some cases. Incidentally, of the total α-alumina particles contained in the raw material for AT formation, the proportion of the α-alumina particles having such a crystal structure that the ratio (D/H) of the average value (D) of the average length in axis a direction and the average length in axis b direction, to the average length (H) in axis c direction is 3 or more, is preferably 10 mass % or higher. When the proportion is lower than 10 mass %, the formed body is inferior in dimensional accuracy in some cases.

As to the titania source raw material, there is no particular restriction, and the titania source raw material includes, for example, rutile and anatase. The proportion of the titania source raw material contained in the raw material for AT formation is preferably 15 to 45 mass %, more preferably 20 to 40 mass %, particularly preferably 25 to 35 mass %. When the proportion of the titania source raw material is not in this range, the proportion of aluminum titanate contained in the aluminum titanate ceramic after firing is low and the firing product has low heat resistance in some cases.

As to the silica source raw material, there is no particular restriction, and the silica source raw material includes, for example, silica, composite oxide containing silica, and substances which are converted into silica after firing. As specific examples of the substances which are converted into silica after firing, there can be mentioned silica glass, kaolin, mullite and quartz. The proportion of the silica source raw material contained in the raw material for AT formation is preferably 1 to 20 mass %, more preferably 3 to 15 mass %, particularly preferably 5 to 12 mass %. When the proportion of the silica source raw material is lower than 1 mass %, the firing product is inferior in durability in some cases. Meanwhile, when the proportion is more than 20 mass %, the proportion of aluminum titanate contained in the aluminum titanate ceramic after firing is low and the firing product is inferior in heat resistance in some cases.

As to the magnesia source raw material, there is no particular restriction, and the magnesia source raw material includes, for example, magnesia, composite oxide containing magnesia, and substances which are converted into magnesia after firing. As specific examples of the substances which are converted into magnesia after firing, there can be mentioned talc and magnesite.

A dispersion medium is added to the raw material for AT formation, followed by kneading, to prepare a kneaded clay. As the dispersion medium, there is used, for example, water or a mixed solvent of water and an organic solvent (e.g. alcohol). Incidentally, in kneading of the raw material for AT formation and the dispersion medium, there may be added, as necessary, additives such as pore former, organic binder, dispersing agent and the like.

As the pore former, there can be preferably used, for example, carbon (e.g. graphite), wheat flour, starch and microcapsules composed of an organic resin (e.g. phenolic resin, poly methyl methacrylate, polyethylene, polyethylene terephthalate, water-absorbing polymer or acrylic resin). As the organic binder, there can be preferably used, for example, hydroxypropyl methyl cellulose, methyl cellulose, hydroxyethyl cellulose, carboxymethyl cellulose and polyvinyl alcohol. As the dispersing agent, there can be preferably used a substance having a surface active effect (e.g. ethylene glycol, dextrin, fatty acid soap or polyalcohol).

The kneading of the raw material for AT formation and the dispersion medium can be conducted by a known kneading method. It is preferably a method of conducting kneading with a shear force being applied, using a kneader high in stirring force and dispersing force, capable of rotating the stirring rod at a high speed of 500 rpm or more, preferably 1,000 rpm or more. By such a kneading method, agglomerates of fine particles, which become the defects of aluminum titanate ceramic, can be pulverized and disappeared.

A formed body can be obtained using the kneaded clay prepared, according to a known forming method such as extrusion forming, press forming or the like. In the case of obtaining, in particular, a formed body having a honeycomb structure, there is preferred, for example, an extrusion forming using a die for honeycomb structure formation, such as disclosed in JP-A-2008-149595. After the formed body obtained has been dried, firing is conducted at a temperature of 1,350 to 1,500° C., preferably 1,430 to 1,470° C., whereby an aluminum titanate ceramic can be produced.

Figure 2:
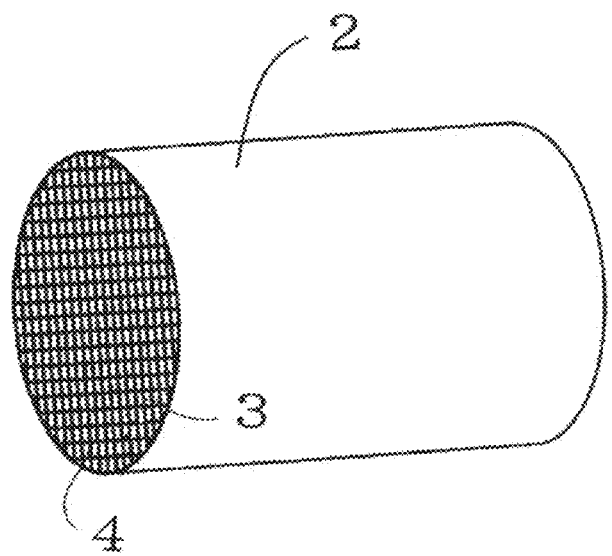
FIG. 2 is a perspective view showing an example of the aluminum titanate ceramic produced by the method for producing an aluminum titanate ceramic of the present invention.

FIG. 2 is a perspective view showing an example of the aluminum titanate ceramic produced by the method for producing an aluminum titanate ceramic of the present invention. In FIG. 2, the aluminum titanate ceramic 2 is a columnar honeycomb structure having a plurality of cells 4 divided by partition walls 3; however, the shape of the aluminum titanate ceramic produced by the method for producing an aluminum titanate ceramic of the present invention is not restricted thereto. The shape may be prismatic or may be a non-honeycomb structure.

The porosity of the aluminum titanate ceramic is preferably 35 to 70%, more preferably 40 to 68%, particularly preferably 44 to 65%. When the porosity is lower than 35%, the pressure loss of the aluminum titanate ceramic is too large in some cases when it is used as a DPF. Meanwhile, when the porosity is higher than 70%, the strength of the aluminum titanate ceramic is insufficient in some cases when it is used as a DPF. Incidentally, the porosity can be measured by mercury intrusion technique with a mercury porosimeter (produced by Micromeritics).

The average pore diameter of the aluminum titanate ceramic is preferably 6 to 30 μm, more preferably 8 to 25 μm, particularly preferably 10 to 20 μm. When the average pore diameter is smaller than 6 μm, the pressure loss of the aluminum titanate ceramic is too high in some cases when it is used as a DPF. Meanwhile, when the average pore diameter is larger than 30 μm, the efficiency for PM capture of the aluminum titanate ceramic is too low in some cases when it is used as a DPF. Incidentally, the average pore diameter can be measured by a mercury porosimeter.

The thermal expansion coefficient of the aluminum titanate ceramic is preferably $1.5 \times 10^{-6}/° C.$ or smaller, more preferably $1.2 \times 10^{-6}/° C.$ or smaller, particularly preferably $0.9 \times 10^{-6}/° C.$ or smaller. When the thermal expansion coefficient is larger than $1.5 \times 10^{-6}/° C.$, the aluminum titanate ceramic is broken by thermal shock in some cases when it is used as a DPF. Incidentally, the thermal expansion coefficient can be measured based on a method described in the automotive standard established by Society of Automotive Engineers of Japan Inc. Standard Organization: Test Method for Ceramic monolithic carrier for catalyst for purification of Monolith Carrier for Automobile Exhaust Gas Purification Catalyst (JASO M 505-87).

When the aluminum titanate ceramic has a cylindrical shape of 140 to 160 mm in diameter and 150 to 200 mm in total length, the roundness thereof is preferably 1.5 mm or less, more preferably 1.0 mm or less, particularly preferably 0.7 mm or less. When the roundness is more than 1.5 mm, the dimensional accuracy of the aluminum titanate ceramic is not good. Incidentally, in the present specification, the roundness refers to a difference between the maximum value and minimum value of the outer diameter of cylindrical aluminum titanate ceramic, when the outer diameter of the cylindrical aluminum titanate ceramic is measured at around the two end faces and at the central point in the circumferential direction, using a laser length tester.

The ratio decomposed into alumina and titania (hereinafter, the ratio is referred to as "AT decomposition ratio") when the aluminate titanate ceramic is treated with heat, is preferably 20% or lower, more preferably 15% or lower, particularly preferably 10% or lower. When the AT decomposition ratio is higher than 20%, the aluminum titanate ceramic has a high thermal expansion coefficient and is inferior in thermal shock resistance in some cases.

EXAMPLES

The present invention is described specifically below by way of Examples. However, the present invention is in no way restricted to these Examples. In the Examples and Comparative Examples, "parts" and "%" are based on mass unless otherwise specified. The methods employed for measurement of properties and the methods employed for evaluation of properties are shown below.

[Porosity (%)]

The true specific gravity of an aluminum titanate ceramic was taken as $3.5 \text{ g/cm}^3$: the total pore volume of the aluminum titanate ceramic was determined using a mercury porosimeter produced by Micromeritics; and the porosity of the aluminum titanate ceramic was calculated from the true specific gravity and the total pore volume.

[Average Pore Diameter (μm)]

The average pore diameter was measured using a mercury porosimeter produced by Micromeritics.

[Thermal Expansion Coefficient ($\times 10^{-6}/° C.$)]

Thermal expansion coefficient was measured based on a method described in the automotive standard established by Society of Automotive Engineers of Japan Inc. Standard Organization: Test Method for Ceramic monolithic carrier for catalyst for purification of Monolith Carrier for Automobile Exhaust Gas Purification Catalyst (JASO M 505-87)

[Roundness (mm)]

For an aluminum titanate ceramic of 144 mm in diameter and 152 mm in total length, measurement was made at the points of 10 mm from the two ends faces and at the central point. The outer diameters at these measurement points were measured in the circumferential direction using a laser length tester, and the difference between the maximum value and minimum value of the measured outer diameters was taken as the roundness of the aluminum titanate ceramic. As the difference is smaller, the aluminum titanate ceramic is better in dimensional accuracy.

[AT Decomposition Ratio (%)]

An aluminum titanate ceramic was heat-treated under Ar atmosphere at 950° C. for 8 hours. The AT decomposition ratio of the aluminum titanate ceramic was calculated from the X-ray diffraction intensities of the aluminum titanate ceramic before and after the heat treatment. Incidentally, X-ray diffraction intensity was measured on the crystal faces (101), (230) and (200) of aluminum titanate ceramic; the reduction ratios of X-ray diffraction intensity in individual faces were calculated; and the average of the reduction ratios was taken as the AT decomposition ratio of the aluminum titanate ceramic.

Example 1

3% of methyl cellulose was added to a raw material for aluminum titanate formation, which contained 57.1% of α-alumina particles (having a ratio (D/H) of the average value (D) of the average length in axis a direction and the average length in axis b direction, to the average length (H) in axis c direction, of 5 and an average particle diameter of 10 μm), 32.5% of titania, 6.4% of silica, 0.4% of magnesia, 3.4% of iron oxide, 0.2% of lanthanum and 1.5% of a water-absorbing polymer (as a pore former). The mixture was kneaded to prepare a kneaded clay. The kneaded clay prepared was subjected to extrusion forming to obtain a formed body having a cylindrical honeycomb structure. After the formed body was dried, the formed body was cut in the length direction into an intended size and sealed, and then fired at 1,450° C. for 4 hours to produce an aluminum titanate ceramic of a cylindrical honeycomb structure of 144 mm in diameter and 152 mm in total length, having a partition wall thickness of 75 μm and a cell density of 46.5 cells/cm$^2$. The aluminum titanate ceramic had a porosity of 50%, an average pore diameter of 15 μm, a thermal expansion coefficient of $0.5 \times 10^{-6}/°$ C., a roundness of 0.5 mm and an AT decomposition ratio of 5%. Incidentally, the α-alumina particles contained Na$_2$O in an amount of 0.027%.

Examples 2 to 8 and Comparative Example 1

Aluminum titanate ceramics were produced in the same manner as in Example 1 except that there were used raw materials for aluminum titanate formation, each having a formulation shown in Table 1. The properties of the aluminum titanate ceramics produced are shown in Table 2.

TABLE 2

|  | Porosity (%) | Average pore diameter (μm) | Thermal expansion coefficient (×10$^{-6}$/° C.) | Roundness (mm) | AT decomposition ratio (%) |
|---|---|---|---|---|---|
| Example 1 | 50 | 15 | 0.5 | 0.5 | 5 |
| Example 2 | 49 | 14 | 0.6 | 0.5 | 5 |
| Example 3 | 51 | 16 | 0.4 | 0.4 | 7 |
| Example 4 | 51 | 15 | 0.4 | 0.4 | 8 |
| Example 5 | 50 | 13 | 0.3 | 0.5 | 4 |
| Example 6 | 57 | 18 | 0.7 | 0.7 | 10 |
| Example 7 | 44 | 10 | 0.2 | 0.9 | 15 |
| Example 8 | 65 | 20 | 0.9 | 0.6 | 2 |
| Comparative Example 1 | 50 | 10 | 0.4 | 1.7 | 30 |

As is appreciated from Table 2, by making high the proportion of the α-alumina particles having such a crystal structure that the ratio (D/H) of the average value (D) of the average length in axis a direction and the average length in axis b direction, to the length (H) in axis c direction is 3 or more, the aluminum titanate ceramic obtained can have a small true roundness, that is, a superior dimensional accuracy. Also, by making low the amount of Na$_2$O contained in the α-alumina particles, the AT decomposition ratio of the aluminum titanate ceramic obtained can be suppressed.

According to the method for producing an aluminum titanate ceramic of the present invention, a DPF used for purification of the exhaust gas emitted from automobile, etc. can be produced at a high dimensional accuracy.

What is claimed is:

1. A method for producing an aluminum titanate ceramic, which comprises:
   forming a raw material for aluminum titanate formation containing a titania source and Na$_2$O-containing α-alumina particles to obtain a formed body; and
   then firing the formed body;
   wherein the α-alumina particles have a crystal structure wherein a ratio (D/H) of an average value of the average length in an axis a direction and an average length in an axis b direction (D), to an average length in an axis c direction (H) is in a range of 4.5 to 20.

2. The method for producing an aluminum titanate ceramic according to claim 1, wherein an average particle diameter of the α-alumina particles is 6 to 15 μm.

TABLE 1

| | α-alumina particles | | | Proportions of the components contained in the raw material for aluminum titanate formation (mass %) | | | | | | | | |
|---|---|---|---|---|---|---|---|---|---|---|---|---|
| | D/H | Average particle diameter (μm) | Proportion of Na$_2$O (mass %) | α-alumina particles | Titania | Silica | Magnesia | Iron oxide | Strontium carbonate | Calcium carbonate | Lanthanum | Pore former |
| Ex. 1 | 5 | 10 | 0.027 | 57.1 | 32.5 | 6.4 | 0.4 | 3.4 | — | — | 0.2 | 1.5 |
| Ex. 2 | 4.5 | 6 | 0.027 | 57.1 | 32.5 | 6.4 | 0.4 | 3.4 | — | — | 0.2 | 1.5 |
| Ex. 3 | 10 | 12 | 0.050 | 57.1 | 32.5 | 6.4 | 0.4 | 3.4 | — | — | 0.2 | 1.5 |
| Ex. 4 | 20 | 15 | 0.100 | 57.1 | 32.5 | 6.4 | 0.4 | 3.4 | — | — | 0.2 | 1.5 |
| Ex. 5 | 5 | 10 | 0.027 | 48.8 | 29.1 | 10.2 | — | — | 10.8 | 0.9 | 0.2 | 1.5 |
| Ex. 6 | 20 | 8 | 0.027 | 30.0 | 32.5 | 6.4 | 0.4 | 3.4 | — | — | 0.2 | 3 |
|  | 1.5 | 5 | 0.250 | 27.1 | | | | | | | | |
| Ex. 7 | 20 | 8 | 0.027 | 10.0 | 32.5 | 6.4 | 0.4 | 3.4 | — | — | 0.2 | — |
|  | 1.5 | 5 | 0.250 | 47.1 | | | | | | | | |
| Ex. 8 | 8 | 13 | 0.010 | 57.1 | 32.5 | 6.4 | 0.4 | 3.4 | — | — | 0.2 | 5 |
| Comp. Ex. 1 | 1.5 | 5 | 0.250 | 57.1 | 32.5 | 6.4 | 0.4 | 3.4 | — | — | 0.2 | 1.5 |

3. The method for producing an aluminum titanate ceramic according to claim 2, wherein the proportion of the α-alumina particles contained in the raw material for aluminum titanate formation is 10 to 60 mass %.

4. The method for producing an aluminum titanate ceramic according to claim 3, wherein a proportion of the $Na_2O$ contained in the α-alumina particles is 0.01 to 0.1 mass %.

5. The method for producing an aluminum titanate ceramic according to claim 4, wherein the formed body has a honeycomb structure.

6. The method for producing an aluminum titanate ceramic, according to claim 3, wherein a proportion of the $Na_2O$ contained in the α-alumina particles is 0.01 to 0.03 mass %.

7. The method for producing an aluminum titanate ceramic according to claim 3, wherein the formed body has a honeycomb structure.

8. The method for producing an aluminum titanate ceramic according to claim 2, wherein a proportion of $Na_2O$ contained in the α-alumina particles is 0.01 to 0.1 mass %.

9. The method for producing an aluminum titanate ceramic according to claim 8, wherein the formed body has a honeycomb structure.

10. The method for producing an aluminum titanate ceramic, according to claim 2, wherein a proportion of the $Na_2O$ contained in the α-alumina particles is 0.01 to 0.03 mass %.

11. The method for producing an aluminum titanate ceramic according to claim 2, wherein the formed body has a honeycomb structure.

12. The method for producing an aluminum titanate ceramic according to claim 1, wherein a proportion of the α-alumina particles contained in the raw material for aluminum titanate formation is 10 to 60 mass %.

13. The method for producing an aluminum titanate ceramic according to claim 12, wherein a proportion of the $Na_2O$ contained in the α-alumina particles is 0.01 to 0.1 mass %.

14. The method for producing an aluminum titanate ceramic according to claim 13, wherein the formed body has a honeycomb structure.

15. The method for producing an aluminum titanate ceramic, according to claim 12, wherein a proportion of the $Na_2O$ contained in the α-alumina particles is 0.01 to 0.03 mass %.

16. The method for producing an aluminum titanate ceramic according to claim 12, wherein the formed body has a honeycomb structure.

17. The method for producing an aluminum titanate ceramic according to claim 1, wherein a proportion of the $Na_2O$ contained in the α-alumina particles is 0.01 to 0.1 mass %.

18. The method for producing an aluminum titanate ceramic according to claim 17, wherein the formed body has a honeycomb structure.

19. The method for producing an aluminum titanate ceramic according to claim 1, wherein a proportion of the $Na_2O$ contained in the α-alumina particles is 0.01 to 0.03 mass %.

20. The method for producing an aluminum titanate ceramic according to claim 1, wherein a formed body has a honeycomb structure.

* * * * *

UNITED STATES PATENT AND TRADEMARK OFFICE
CERTIFICATE OF CORRECTION

PATENT NO. : 8,409,492 B2
APPLICATION NO. : 12/707726
DATED : April 2, 2013
INVENTOR(S) : Yasushi Noguchi et al.

It is certified that error appears in the above-identified patent and that said Letters Patent is hereby corrected as shown below:

Title Page, Item (56) References Cited

Foreign Patent Documents: Change "JP 2006/028506 A2 3/2006" to

-- WO 2006/028506 A2 3/2006 --

Signed and Sealed this
Eighteenth Day of June, 2013

Teresa Stanek Rea
*Acting Director of the United States Patent and Trademark Office*